(12) United States Patent
Korobov et al.

(10) Patent No.: US 11,165,709 B1
(45) Date of Patent: *Nov. 2, 2021

(54) RESOURCE USAGE FOR A REMOTE SESSION USING ARTIFICIAL NETWORK BANDWIDTH SHAPING

(71) Applicant: Parallels International GmbH, Schaffhausen (CH)

(72) Inventors: Ivan Korobov, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/939,822

(22) Filed: Jul. 27, 2020

Related U.S. Application Data

(63) Continuation of application No. 16/130,246, filed on Sep. 13, 2018, now Pat. No. 10,771,393.

(51) Int. Cl.
| | |
|---|---|
| *H04L 12/815* | (2013.01) |
| *H04L 12/853* | (2013.01) |
| *H04L 29/08* | (2006.01) |
| *H04N 19/172* | (2014.01) |
| *H04L 12/805* | (2013.01) |
| *H04L 12/811* | (2013.01) |
| *H04L 12/825* | (2013.01) |

(Continued)

(52) U.S. Cl.
CPC .......... *H04L 47/2416* (2013.01); *H04L 47/23* (2013.01); *H04L 47/25* (2013.01); *H04L 47/365* (2013.01); *H04L 67/025* (2013.01)

(58) Field of Classification Search
CPC ..... H04L 47/2416; H04L 47/23; H04L 47/25; H04L 47/365; H04L 67/025; H04L 47/00; H04L 47/10; H04L 47/22–2491; H04L 47/26–263; H04L 47/36–365; H04L 47/38; H04L 47/263; H04L 65/4092; H04L 67/2823; H04L 67/2828; H04N 19/172; H04N 19/10–196; G06T 9/007
See application file for complete search history.

(56) References Cited

U.S. PATENT DOCUMENTS

| | | | |
|---|---|---|---|
| 7,116,682 B1 * | 10/2006 | Waclawsky | H04L 47/824 370/468 |
| 7,383,457 B1 * | 6/2008 | Knight | G06F 1/32 713/320 |

(Continued)

*Primary Examiner* — Maharishi V Khirodhar
*Assistant Examiner* — Kenneth P Hunt
(74) *Attorney, Agent, or Firm* — Rosenberg, Klein & Lee (57) ABSTRACT

Disclosed are systems and methods for managing computing resources for a remote session that has been established between a client and a remote server via a communication channel. Such a remote session is configured to automatically adapt image quality of the remote session based on a network status of the communication channel. The described technique includes detecting an inactive state of the remote session, and in turn, modifying at least one network setting of the client using a network shaping rule specified to artificially reduce a network quality of the communication channel used by the client for traffic of the remote session, so as to cause the client to reduce image quality of the remote session and reduce an amount of data exchanged between the remote server and the client.

9 Claims, 5 Drawing Sheets

(51) Int. Cl.
*H04L 29/06* (2006.01)
*G06T 9/00* (2006.01)

(56) References Cited

U.S. PATENT DOCUMENTS

| | | | | |
|---|---|---|---|---|
| 7,735,139 | B1* | 6/2010 | Chou | H04L 63/145 |
| | | | | 726/24 |
| 10,771,393 | B1* | 9/2020 | Korobov | H04L 67/025 |
| 2003/0138043 | A1* | 7/2003 | Hannuksela | H04N 19/114 |
| | | | | 375/240.08 |
| 2004/0260750 | A1* | 12/2004 | Ruutu | H04L 47/70 |
| | | | | 709/200 |
| 2006/0095398 | A1* | 5/2006 | Bhaskaran | H04L 65/80 |
| 2008/0222532 | A1* | 9/2008 | Mester | H04L 63/145 |
| | | | | 715/738 |
| 2009/0017860 | A1* | 1/2009 | Cole | H04W 52/265 |
| | | | | 455/522 |
| 2009/0290491 | A1* | 11/2009 | Karagiannis | H04L 47/125 |
| | | | | 370/235 |
| 2009/0307511 | A1* | 12/2009 | Fiennes | G06F 1/3215 |
| | | | | 713/323 |
| 2013/0297743 | A1* | 11/2013 | Eschet | H04L 65/60 |
| | | | | 709/219 |
| 2013/0322255 | A1* | 12/2013 | Dillon | H04L 43/0888 |
| | | | | 370/236 |
| 2014/0280869 | A1* | 9/2014 | Werner | H04L 65/1069 |
| | | | | 709/224 |
| 2018/0295607 | A1* | 10/2018 | Lindoff | H04L 5/0053 |

* cited by examiner

RESOURCE USAGE FOR A REMOTE SESSION USING ARTIFICIAL NETWORK BANDWIDTH SHAPING

RELATED APPLICATIONS

This application is a continuation of U.S. patent application Ser. No. 16/130,246 filed on Sep. 13, 2018, the entire content of which is incorporated by reference herein.

FIELD OF TECHNOLOGY

The present disclosure relates generally to the field of remote computing, more specifically, to systems and methods for managing computing and network resources used by a remote session.

BACKGROUND

Remote desktop technologies (also referred to as "remote access") allow a local user interacting with a local computing device to control and view a remote desktop session originating from a remote computer or host. A remote desktop client application running on the client computer and a remote desktop server application running on the server computer together facilitate "remoting" a desktop session. The remote desktop client application receives user input, such as keyboard and mouse input, and converts the input into a network-compatible representation to be transmitted to the server computer. The remote desktop server application running on the server computer receives the network-compatible representation of the user input, and converts this representation into actual input messages. The input messages are then sent to the server computer's message queue and processed as if the input was generated at the server computer. Therefore, applications running on the server computer respond to the input as if the input was generated at the server computer.

Remote access protocols often include optimizations that focus on providing smooth remote-session user experiences in different and potentially dynamic environments. Those optimizations include such approaches as the tuning of data exchange rates depending on a network connection speed and/or quality, the tuning of user experience settings to reduce load on a server, and so forth.

In some cases, a user may work in a mixed local and remote environment, wherein the user operates both local and remote applications (i.e., applications running in a remote session) simultaneously. For example, a user may access via remote session an instance of an enterprise docketing software that is only available on a central server, while also running on their local desktop a mail application and a word processing application. As part of their workflow, the user may regularly switch between using docketing software (i.e., the remote application) and using the locally-executing applications. In such use cases, there may be usage patterns in which the running remote applications and as such the remote session(s) are not frequently used, but nonetheless consume client- and server-side computing resources to draw and update the image of the remote session and application content, to consume network bandwidth to exchange data, and, if the client computer is running on a battery, to consume power and as such reduce the computer operating time.

Existing solutions for remote-session user experience optimization are limited to providing the best user experience for an active remote session. There are also means for client applications to optimize resource usage. For example, the client-side application can request updates for visible portions of the remote session screen only. However, such optimizations require the client-side application to explicitly use a particular remote protocol-specific API (if available), so such optimization must be taken into consideration during the client-side application development. Therefore, it is desirable to optimize resource usage of a remote session established between a client and a server.

SUMMARY

Thus, a system and method is disclosed herein for optimizing resource consumption without relying on a specific client-side application implementation, and without relying on express support from a remote desktop protocol for usage optimization. Aspects of the present disclosure provide a method for managing computing resources for a remote session by leveraging the core remote protocol capabilities to adjust itself to poor network conditions. Such techniques can be applied to a wide range of client-side applications, which might not have higher-level optimization techniques available.

According to one aspect of the present disclosure, a method for managing computing resources for a remote session is provided. The method includes establishing a remote session between a client and a remote server via a communication channel. The remote session is configured to automatically adapt image quality of the remote session based on a network status of the communication channel. The method further includes detecting, at the client, an inactive state of the remote session established between the client and the remote server, and responsive to detecting the inactive state, modifying at least one network setting of the client using a network shaping rule specified to artificially reduce a network quality of the communication channel used by the client for traffic of the remote session, so as to cause the client to reduce image quality of the remote session and reduce an amount of data exchanged between the remote server and the client.

In another aspect, the method further includes, responsive to detecting an active state of the remote session, modifying the at least one network setting to restore the network quality of the communication channel so as to cause the client to restore image quality of the remote session.

In another aspect, the network shaping rule is configured to restrict an amount of network resources available to the communication channel.

In another aspect, the method further includes generating the network shaping rule based on a network address and port number of the server received from a remote session client.

In another aspect, the detecting the inactive state of the remote session includes on detecting a context switch of an application process corresponding to the remote session to background.

In another aspect, the detecting the inactive state of the remote session includes detecting a change in window visibility of the remote session.

In another aspect, the detecting the inactive state of the remote session includes detecting a threshold idle time period has been exceeded in which a user has not interacted with the remote session.

In another aspect, the detecting the inactive state of the remote session includes detecting a display screen dimming of the client.

In another aspect, the modifying at least one network setting of the client using the network shaping rule specified to artificially reduce the network quality of the communication channel used by the client for traffic of the remote session is performed in response to determining that a battery level of the client has dropped below a threshold low level.

In another aspect, the modifying the at least one network setting of the client using the network shaping rule further includes executing a traffic control system API (application programming interface) exposed by an operating system of the client to decrease a quality-of-service network setting of the communication channel.

In another aspect, the executed traffic control system API is configured to deprioritize TCP/IP and UDP/IP network traffic associated with the communication channel.

In another aspect, the executed traffic control system API is configured to throttle network traffic associated with the communication channel.

In another aspect, the modifying the at least one network setting of the client using the network shaping rule further includes executing a packet filter configured to drop one or more network packets associated with the communication channel.

In another aspect, the network shaping rule is configured to reduce the network quality by a target degree based on a corresponding degree of inactivity of the remote session.

According to another aspect, a system for managing computing resources for a remote session is provided. The system includes a network interface, and a hardware processor. the hardware processor is configured to establish a remote session between a client and a remote server via a communication channel using the network interface, wherein the remote session is configured to automatically adapt image quality of the remote session based on a network status of the communication channel; detect, at the client, an inactive state of the remote session established between the client and the remote server; and responsive to detecting the inactive state, modify at least one network setting of the client using a network shaping rule specified to artificially reduce a network quality of the communication channel used by the client for traffic of the remote session, so as to cause the client to reduce image quality of the remote session and reduce an amount of data exchanged between the remote server and the client.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for managing computing resources in remote sessions. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Existing solutions for remote-session user experience optimization are limited to providing improved user experience of action sessions using protocol-specific techniques. Existing protocols (such as Microsoft RemoteFX) adjusts picture quality and the amount of data exchanged between remote session host and a client application, depending on the current network conditions, CPU usage, etc. However, such adjustments are applied to an active remote session in order to provide as smooth a user experience as possible in the given circumstances. For example, a remote desktop protocol may use progressive rendering adapted based on the current network bandwidth. The remote screen image (e.g., framebuffer) is sent "progressively", i.e., a first image is sent highly compressed, such that picture quality is poor, and then consequence frames "refine" the image details. This progressive rendering technique adjusts the progressive encoding rules dynamically, depending on the current network conditions: if network quality is bad, then the image is sent compressed such that less details are visible, but the framerate is maintained at a high level. If network conditions become better, then a higher quality image is sent to the client for subsequent frames.

Aspects of the present disclosure use intrinsic protocol capabilities to adjust the remote session experience to changing network conditions. Unlike in known approaches, the described technique "artificially" reduces the network bandwidth assigned to the client-server network channel in order to reduce the resource consumption in certain cases. The "artificial" reduction of network bandwidth refers to modification of one or more indicators, configurations, and settings relied upon by other system components so as to present the only appearance of poor network bandwidth and/or network conditions.

Figure 1:
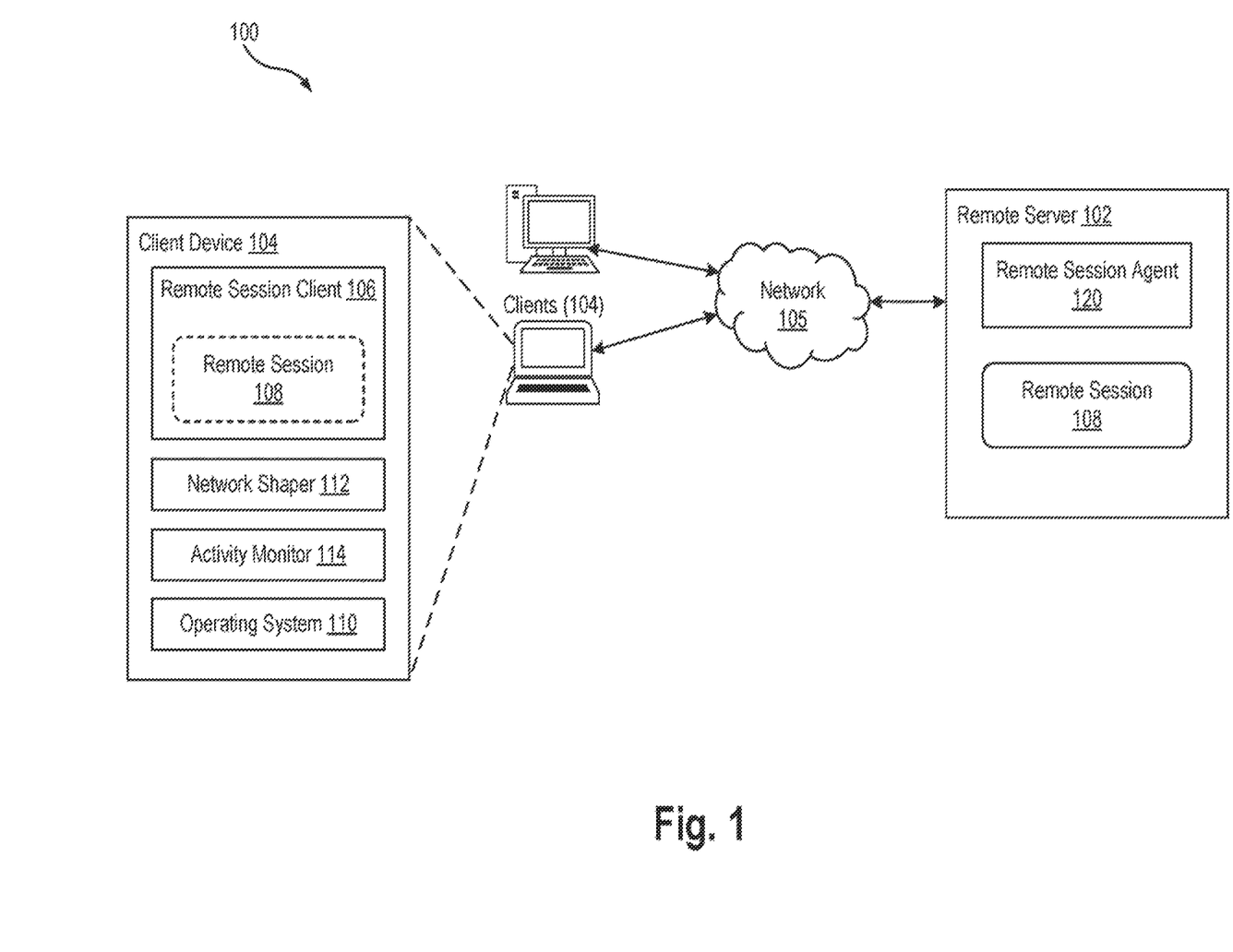
FIG. 1 is a block diagram illustrating a system for managing computing resources in a remote session according to an exemplary aspect.

FIG. 1 is a block diagram illustrating a system 100 for managing computing resources in a remote session according to an exemplary aspect. The system 100 includes a remote server 102 communicatively connected to one or more client devices 104 by a communications network 105. The client device(s) 104 and/or the remote server 102 may be any computing device, physical server, computer server, desktop, laptop, handheld device, tablet device, smartphone, or any other electronic device as described herein. The network connection between the client device(s) 104 and the remote server 102 may be a network socket, or other more complex communication channel. In some aspects, the network 105 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

In one aspect, the client device 104 includes a remote session client 106 configured to establish a remote session 108 with a remote session agent 120 executing on the remote server 102. The remote session 108 established between the remote session client 106 and the remote server 102 may be configured to provide access at the client device 104 to one or more applications that might not be otherwise available or installed locally on the client device 104. In one aspect, the remote session agent 120 may be a remote application server (RAS) agent configured to remotely provide instances of software applications to the client device 104. In other words, the remote session agent 120 is said to "publish" resources, which can include one or more remote or "published" applications, to a client device 104, which is rendered and displayed on a local display device of the client device 104. The remote server 102 may be a virtual application and desktop delivery system that allows users to access and use applications and data from any device, such as the client device 104.

In some aspects, the remote session client 106 is a software application that establishes the remote session 108 as a connection to a new instance of a virtual desktop (e.g., a virtual machine) spawned by the remote server 102 specifically for a remote session 108, and that allows access to a user's data and applications (e.g., via a roaming profile). An example of a remote session client 106 may be a Parallels® RAS Client (Remote Application Server™ Client) software application. In other aspects, the remote session client 106 may be a remote access application that establishes the remote session 108 as a remote desktop connection to a specific computing device (having the remote session agent 120 executing thereon), such as the user's desktop at their office, server, or virtual machine. Example of remote access applications include Parallels Access® (formerly Parallels Mobile), Apple Remote Desktop™, Citrix GoToMyPC®, and Virtual Network Computing (VNC®). In some aspects, the remote session agent 120 may provide a virtual desktop environment, sometimes referred to as a virtual desktop infrastructure (VDI) for executing applications and accessing data (e.g., private files). In some aspects, the remote session 108 may be implemented using a remote desktop protocol, such as Remote Desktop Protocol (RDP), Virtual Network Computing (VNC), or Personal Computer over Internet Protocol (PCoIP).

According to one aspect, the remote session client 106 and remote session agent 120 may coordinate, using the remote access protocol defined between the parties, and dynamically adapt the remote session 108 based on the network and computing resources available to the communicatively connected computing devices. For example, the remote session 108 may be adapted to adjust its graphics encoding stack, encoding frame rate, and image quality to suit the current or ongoing constraints of the quality of the network connection (e.g., bandwidth) and/or resource (CPU availability) and hardware capabilities of the client device 104 and/or the remote server 102.

In one aspect, the client device 104 further includes an operating system 110 configured to support execution of the remote session client 106, a network shaper module 112, and an activity monitor 114. In some aspects, the network shaper module 112 and/or the activity monitor 114 may be executed in-process with the client application (remote session client 106) or as separate processes or modules.

The activity monitor 114 is configured to detect if the remote session client 106 is not being actively used (e.g., the remote session client is not the foreground process, or windows which belong to the given remote session are hidden behind other applications' windows, etc.). In one implementation, the activity monitor 114 can use NSWorkspace API on macOS® platforms, or WinAPI functions like GetForegroundWindow on Windows®.

The activity monitor 114 is configured to check for inactivity or other conditions (as described herein) that are appropriate for adjusting the networking bandwidth of the channel between the client and remote session host computer. Such conditions may include the switch of remote session application process to/from background, a change in the remote session window(s) visibility (hidden/partially visible/fully visible), idle time when the user is not interacting with the remote session, host screen dimming (which means that the user is not actively using the client device at all), client machine battery level (if battery drains under certain level, shaping rule is applied regardless whether the remote session client is active or not), and/or in combination with a threshold time (i.e., activity monitor detects that the remote session client is not active for N seconds or more).

If the activity monitor detects that a condition to reduce resource consumption is met, the activity monitor 114 commands the network shaper module 112 to apply a corresponding set of rules to the remote session network channel to artificially reduce its quality, so client/server remote protocol implementation will adjust itself to the "poor" network by reducing picture quality from the remote session, etc. Additionally, if the activity monitor 114 detects that the remote session client 106 has regained the user's attention (e.g. remote application window was brought to front), the activity monitor 114 may command the network shaper module 112 to disable the network shaping rules, so that network bandwidth between client and server is restored and remote session quality and performance is enhanced back according to remote protocol implementation.

In some aspects, if multiple remote session are opened, traffic shaping rules can be applied for a specific connection and respective remote session. Each remote session 108 has its own corresponding pair of remote server address and port. The network traffic shaper module 112 may apply shaping rules for a given {address, port} pair, such that if there are multiple remote sessions, rules can be applied for on a per-session basis, i.e., different remote sessions can have different rules applied. For example, the network shaper module 112 may apply a network shaping rule to a first communication channel for a first remote session that was detected "inactive", while also applying a different network shaping rule (or no rule at all) to a different, second communication channel for another, second remote session established with a different remote server (or same server 102). It is noted that if a remote session client 106 is connected to multiple remote servers 102, network connection quality can be different for different remote servers (e.g. one server is in the same LAN as the client, so they have fast and low latency connection between them; and another server is in different country, so connection is slow and latency-filled). Each connection can be metered and adjusted by the remote session protocol independently. Using the aspects of the present disclosure, the remote session protocol's capability to adjust itself to changing network conditions is used to artificially limit network bandwidth for a particular connection (of an inactive remote session), even if other remote session communication channels are over the same LAN.

Network bandwidth for a connection to a given remote session can be adjusted dynamically. In some cases, the exact value of the bandwidth limit is calculated by activity monitor 114. In some aspects, the specific traffic shaping rules may be generated to modify the network settings by a degree that is proportional to the degree of inactivity detected in the remote session. The generated network shaping rule can adjust the network bandwidth by an amount based on how long the remote session has been inactive. For example, the network shaper 112 may generate a network shaping rule that results in the network bandwidth being artificially degraded by 25% at the outset of inactivity, and then generate a subsequent network shaping rule that results in the network bandwidth being further adjusted (e.g., by 50%) if the period of inactivity continues past a threshold time period.

The network shaper module 112 is configured to modify at least one network setting of the client using a network shaping rule specified to artificially reduce a network quality of the communication channel used by the client for traffic of the remote session, so as to cause the client to reduce image quality of the remote session and reduce an amount of data exchanged between the remote server and the client. As an example, the remote session agent 120 may encode each frame or framebuffer of the remote session to a lower bitmap encoding rate, resulting in decreased image size and data size that is transmitted over the network 105 and processed by the client device 104. In another example, the remote session agent 120 may adapt the frame rate (frame throttling) to transmit frame(s) less frequently, resulting in a decreased overall data throughput over the network 105.

In some aspects, the network shaping can affect other system settings of the operating system 110 and client device 104, such as dynamically disabling a graphics processing unit (GPU), software GPU, GPU acceleration, or graphics library. Such a GPU may typically be used to assist with rendering the GUI of the remote session on the client. But if modified, the remote session 108 may detect such a modification as a reduced client capability (e.g., a reduced client rendering speed), and then adapt the remote session to decrease the image quality and frame-rate. In other aspects, the network shaper module 112 may in fact change other, non-network-related system settings, such as the CPU speed or system load of the client device 104.

Figure 2A:
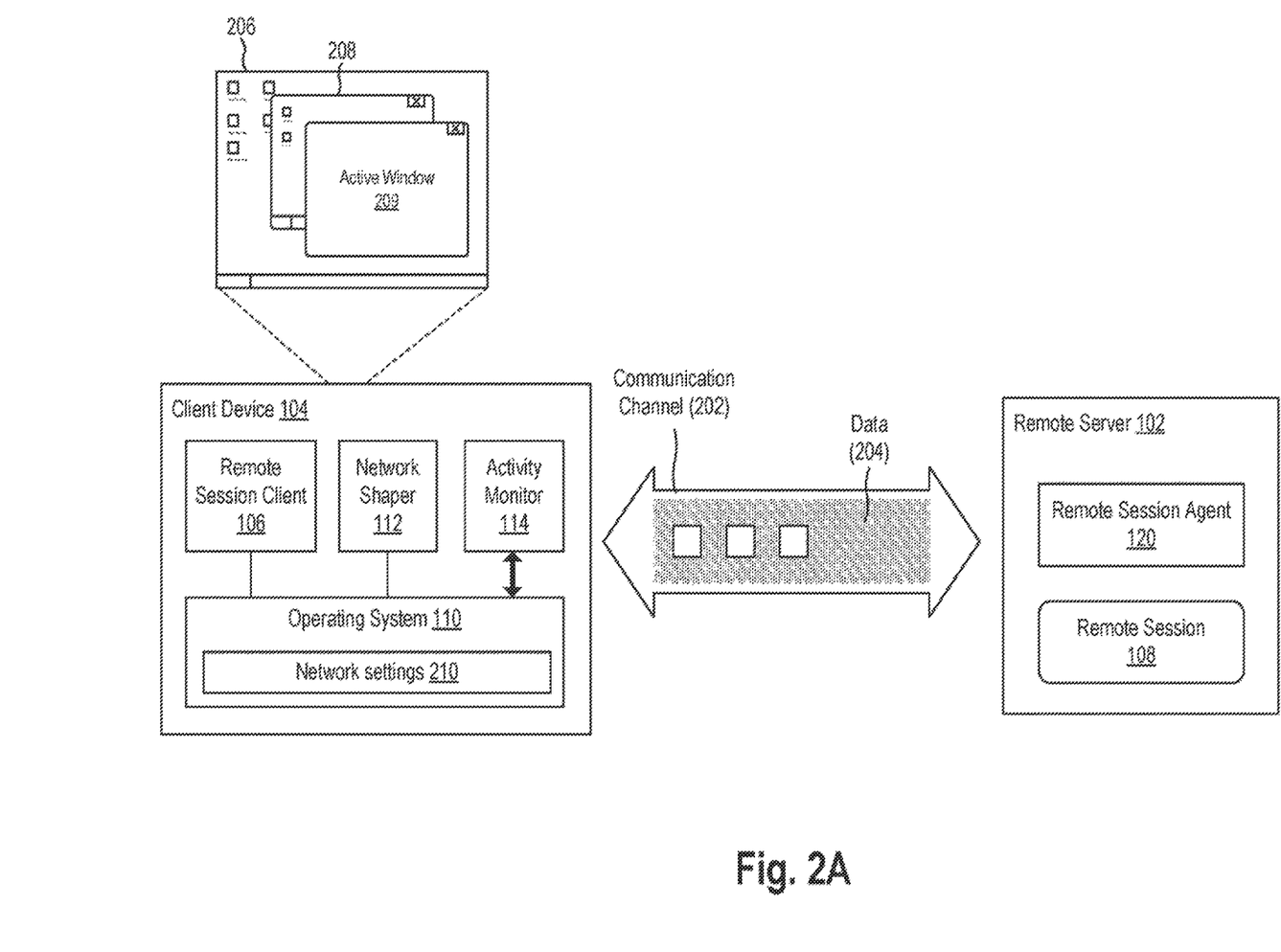
FIGS. 2A, 2B, and 2C are block diagrams illustrating operations for managing resource consumption in a remote session using the system of FIG. 1.
Figure 2B:
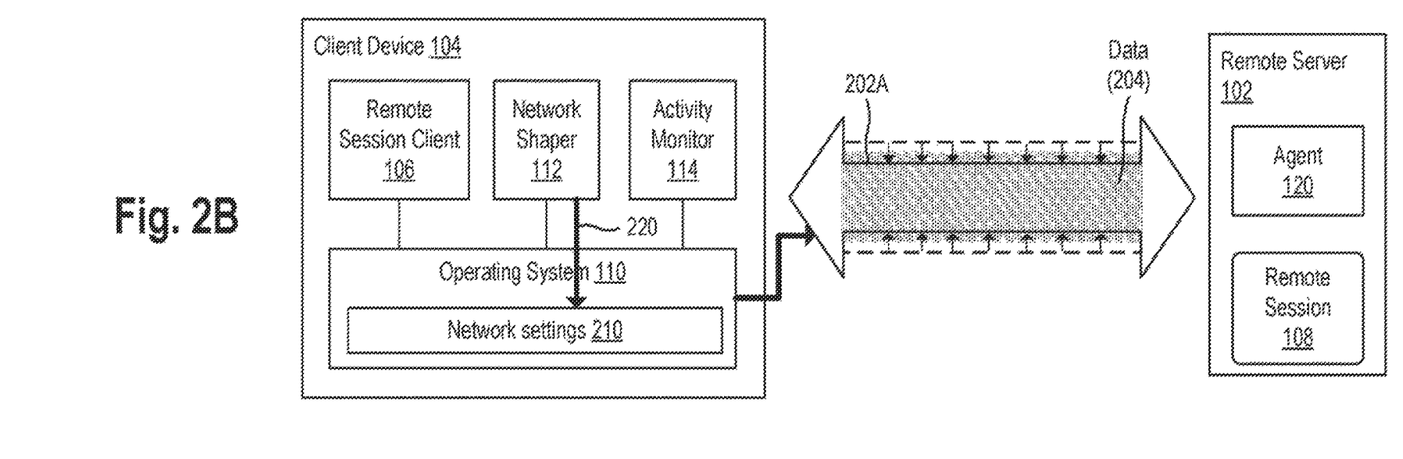
Figure 2C:
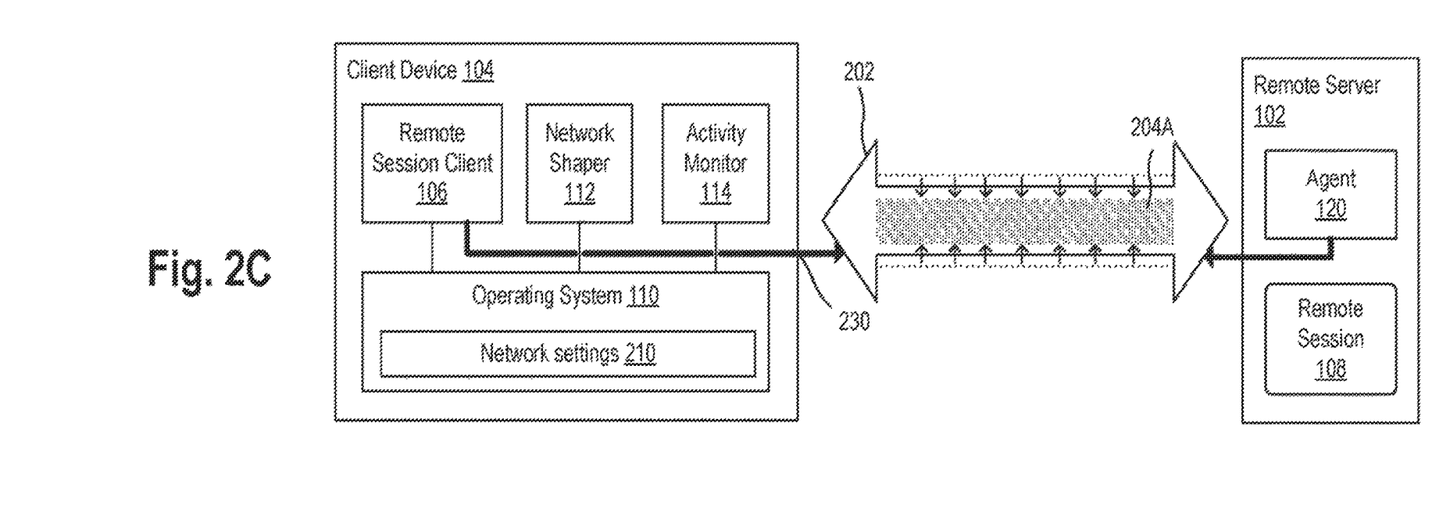

FIGS. 2A to 2C are block diagrams illustrating operations for managing resource consumption in a remote session using the system of FIG. 1. In the scenario depicted, a user starts execution of the remote session client 106 on the client device 104. The remote session client 106 may (e.g., as directed by user input) open a remote session 108 to a host, such as the remote server 102. In some aspects, the remote session client 106 establishes a communication channel 202 with the remote session agent 120 executing on the remote server 102. The remote session agent 120 may instantiate the remote session 108 by executing a virtual machine on the remote server 102 that corresponds to the remote session 108. During execution, the remote session client 106 and remote session agent 120 exchange data 204 which may include output data such as graphical data, framebuffers, graphical primitives (e.g., controls, forms, fonts, and colors) used to generate the remote desktop at the client-side, and other remote session protocol data. Data 204 may also include input data such as keyboard data, mouse data, and other input device data used to control the remote session 108. The data 204 exchanged over the communication channel 202 is depicted in FIG. 2A as a filled region having a thickness indicative of the amount of network resources consumed by the data.

As shown in FIG. 2A, the remote session client 106 renders and displays a graphical user interface (GUI) 208 corresponding to the remote session 108. The remote session GUI 208 may be a window (i.e., graphical control element) incorporated into a GUI 206 of the operating system 110 and displayed on a display operatively connected to the client device 104. The remote session GUI 208 may display an entire (remote) desktop, a portion of a desktop, a single windowed application, or multiple windows, of published applications and resources which are executing as part of the remote session 108.

The network shaper module 112 determines network address information associated with the communication channel 202 established between the client device 104 and remote server 102 for use in preparing a network bandwidth shaping rule. The network address information may include the IP address and port number of the remote host, as well as other networking metadata. In one aspect, the remote session client 106 determines the remote host address and port information and passes this information to the network shaper module 112 to prepare a network bandwidth shaping rule. In other aspects, the activity monitor 114 may be configured to detect that a network connection is established on a predefined port, and pass such networking information to the network shaper module 112.

During operation of the client device 104, there may be a period of inactivity on the remote session client 106. For example, the user may switch usage from the remote session client 106 to a local application. This state is depicted in FIG. 2A, in which a graphical window 209 corresponding to another application is rendered in the foreground, representing the other application being actively used. The remote session GUI 208 is depicted in the background, and having at least a portion of the GUI 208 overlapped and hidden by the active window 209.

The activity monitor 114 detects that the remote session client 106 has not been active for a threshold period of time (e.g., N seconds). The activity monitor 114 then commands the network shaper module 112 to apply the configured network shaping rules for the client/server connection (e.g., communication channel 202). In some aspects, the activity monitor 114 passes an indication of a state of inactivity to the network shaper module 112.

As shown in FIG. 2B, the network shaper module 112 applies the network shaping rule to the communication channel 202, such that the bandwidth of the network channel to the remote host 102 is reduced (arrow 220). In some aspects, the network shaper module 112 requests the operating system 110 to execute the network shaping to modify to one or more network settings 210 which are associated with the communication channel 202. The changes effectuated on the communication channel 202 is graphically depicted in FIG. 2B by a contracted region 202A, where the reduced thickness of the communication channel 202 represents the reduced network resources (e.g., bandwidth) and computing resources allocated to the communication channel. The original thickness/bandwidth of the communication channel is shown in FIG. 2B in dashed outline. It is noted that, for a brief period, the original amount of data 204 (and network resources used to exchange the data) may exceed the resources of the modified communication channel 202, which is represented in FIG. 2B by the thickness of the filled region 204 exceeding the contracted region 202A.

As shown in FIG. 2C, the remote protocol implementation discovers a drop in network quality within the communication channel 202. This discovery may be performed on the client side (e.g., the remote session client 106), on the server side (e.g., remote session agent 120), or using a combination of both components. In turn, the remote protocol implementation (e.g., remote session client 106 and/or remote session agent 120) lowers the picture quality and frame rate to match the reduced network bandwidth (arrow 230). As a result of the reduced picture quality and frame rate, the remote session client 106 may render a less detailed image of the remote session 108 and/or at a lower frame rate. As such, the described technique improves the functionality of the computing device(s) and improves remote desktop technology by decreasing the amount of computing and network resources required to execute the remote session 108 and without a noticeable loss of performance (since the remote session is inactive). The changes to the remote session 108 are depicted in FIG. 2C by a contracted region 204A, where the reduced thickness of the filled region 204 represents the decrease in the amount of data utilized by the remote session. The original thickness/data usage of the remote session is shown in FIG. 2C in dotted outline.

Accordingly, aspects of the present disclosure allow for the optimization of local and remote resource usage without requiring significant changes to be made to existing remote session clients, hosts, or protocols. The described aspects further allow for the adjustment of network traffic for a particular remote connection when multiple connections are opened by the remote session client. Additionally, by using fine-granted bandwidth shaping rules, the described technique allows for the resource optimization for cases which are not directly related to network link quality, such as a low battery level on the client host.

Figure 3:
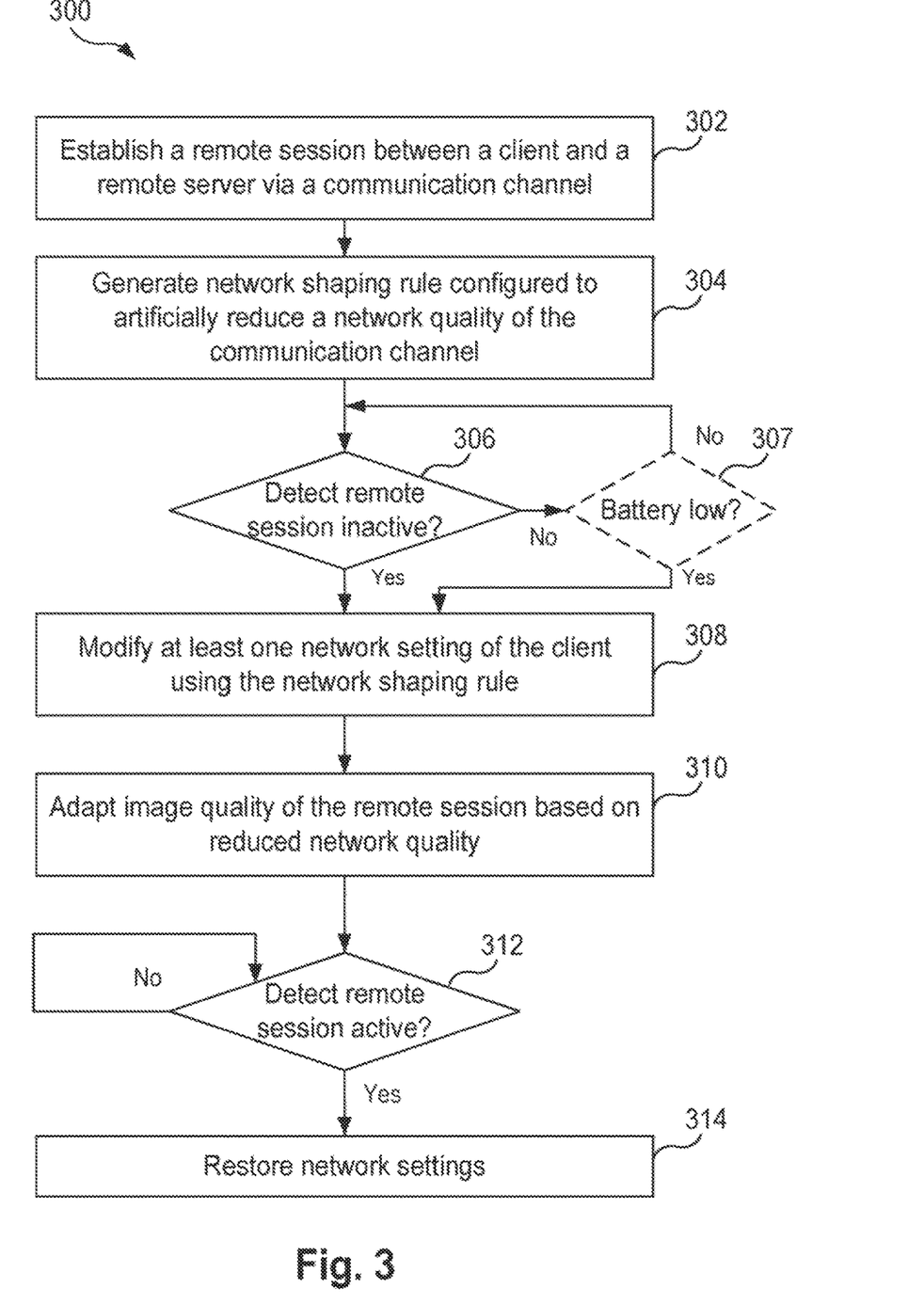
FIG. 3 is a flowchart illustrating a method for managing computing resources in a remote session according to an exemplary aspect.

FIG. 3 is a flowchart illustrating a method 300 for managing computing resources for a remote session according to an exemplary aspect. It is noted that the following description of the exemplary method makes reference to the system and components described above.

The method 300 begins at step 302, in which the remote session client 106 establishes a remote session between a client device 104 and a remote server 102 via a communication channel (200). The remote session is configured to automatically adapt image quality of the remote session based on a network status of the communication channel, for example, according to technologies specified by the particular remote session protocol in use.

At step 304, the network shaper module 112 may generate a network shaping rule specified to artificially reduce a network quality of the communication channel used by the client for traffic of the remote session. In some aspects, the network shaper module 112 may generate one or more network shaping rule(s) based on network address and port information (e.g., "139.130.4.5:3389") passed by the module 112 by the remote session client 106, or by the activity monitor 114. The network shaping rule may be configured to restrict an amount of network resources available to the communication channel. In some aspects, the network shaping rule(s) may include one or more packet filtering rules that specify the capture or dropping of at least a portion of network traffic associated with the remote session. For example, the generated network shaping rule may specify the removal of some network traffic having a destination or source network address and port that matches 139.130.4.5:3389, which is associated with the communication channel 202.

At step 306, the activity monitor 114 detects whether the remote session established between the client and the remote server is in an inactive state. A variety of techniques may be used to detect an inactive state of the remote session 108. In one aspect, the activity monitor 114 determines the remote session is in an inactive state by detecting any context switches of an application process corresponding to the remote session to background. For example, the activity monitor may periodically poll the operating system 110 using a system call configured to retrieve handle to the foreground window (e.g., the window with which the user is currently working), such as the GetForegroundWindow( ) function exposed by the Windows® operating system. Or an activeApplication( ) function provided by the NSWorkspace API on the macOS® operating system. In other implementations, the activity monitor may set an event handler that is invoked whenever there is a change to the foreground window. When the activity monitor 114 detects the foreground window is not the remote session GUI 208 (i.e., not active) for a threshold period of time (e.g., N seconds), the activity monitor 114 may declare the remote session to be in an inactive state.

In some aspects, the activity monitor 114 may determine the remote session is in an inactive state by detecting a change in window visibility of the remote session GUI 208. For example, the activity monitor may check the visibility state of the window of the GUI 208 using a system call (e.g., IsWindowVisible( ) function exposed by Windows) configured to indicate whether a particular window is hidden, partially visible, or fully visible. That is, the activity monitor infers inactivity of the remote session based on whether another window (of another application executing on the client device) is partially or completely hiding the remote session GUI. Upon the activity monitor detecting that the window of the remote session GUI 208 has been hidden or partially visible for a threshold period of time, the activity monitor 114 may declare the remote session to be in an inactive state.

In some aspects, the activity monitor 114 may determine that the remote session is in an inactive state by detecting a threshold idle time period has been exceeded in which the user has not interacted with the remote session. The activity monitor 114 may receive signals from the remote session client indicating whether the remote session has been interacted with recently. In other aspects, the activity monitor 114 may determine that the remote session is in an inactive state by detecting a display screen dimming of the client device (e.g., using a GetMonitorBrightness( ) function). The operating system 110 of the client device may operate in a power management mode that automatically dims the brightness of the client device's display in response to a predefined period of idleness. The activity monitor 114 may leverage this dimming mode to infer that, if the user does not actively use the client device at all, then the remote session 108 is also inactive.

In alternative aspects, the activity monitor 114 may use other variables and conditions for determining whether to reduce networking and computing resource consumption by artificially degrading a network communication channel used for a remote session. For example, at step 307, the activity monitor 114 may determine that the battery level of the client device 104 has reached a threshold low level. That is, the activity monitor can check the client device's battery level, and if the battery is drained under a certain level, the activity monitor can declare a state of "inactivity" to force application of the network shaping rule, regardless of whether the client application is active or not. The battery level variable may be used alone or in conjunction with the inactivity check for triggering the network shaping rules. It is noted that the less data and video frames that a client device 104 has to process, the less CPU and GPU cycles it consumes, such a battery of the client device 104 also drains less. So, if battery level is low, an artificial network shaping rule is applied, limiting network bandwidth for connections to remote sessions, even if network link quality itself is good.

At step 308 (i.e., responsive to detecting the inactive state), the network shaper module 112 modifies at least one network setting (210) of the client using the generated network shaping rule. In some aspects, the network shaper module 112 may execute a traffic control system API (e.g., exposed by the operating system 110 or third-party library) to decrease a quality-of-service network setting of the communication channel 202. The traffic control API used by the network shaper module 112 may be used to apply prioritization (i.e., deprioritize) and/or send-rate throttling TCP/IP and UDP/IP network traffic associated with the communication channel. In some implementations, the network shaper module 112 can use the Windows Filtering Platform API, Traffic Control API, Transport Driver Interface (TDI) filters, Network Driver Interface Specification (NDIS) filters, Winsock Layered Service Providers (LSP), or other suitable network management features exposed by the operating system 110.

In some aspects, the network shaper module 112 may modify network settings by executing a packet filter configured to drop one or more network packets associated with the communications channel. In one implementation, the network shaping rules are in fact packet filtering rules tailored to network traffic of the communication channel, and the network shaper module 112 may invoke the Windows Filtering Platform (WFP) (and exposed by the WFP API) or some third-party component to enable these packet filtering rules. In another implementation, the network shaping rules are implemented in a packet filter configuration file (e.g., pf.conf), and the network shaper module 112 may use a packet filter/traffic shaping utility, such as the pfctl and dnctl utilities made available on Unix-based systems, to modify, drop, or pass packets according to the rules or definitions specified in the pf.conf.

One example implementation using the Windows Filtering Platform is described as follows. The WFP API enables a developer to write code that interacts with the packet processing that takes place at several layers in the networking stack of the operating system 110. Network data can be filtered and also modified before it reaches its destination. In one example, the network shaper 112 may be implemented using a kernel-mode driver sometimes referred to as a "callout driver" that implements one or more callouts. The callout driver may register one or more callouts (which are a set of functions that provide functionality that extends the capabilities of the Windows Filtering Platform) with the filter engine so that the filter engine can call the callout functions for the callout when the client device 104 processes certain connections or packets. One of the callout functions may include a classify function ("classifyFn") which the filter engine invokes during network-related operations. The callout functions may be configured to inspect the network packet, modify it, alter its processing path or even drop it from the further processing at different points of processing paths. WFP defines a set of filtering layers, which allows the addition of filters into different points and paths of network processing. FwpmFilterAdd function permits the addition of a custom filter with the callouts registered earlier to a necessary point of networking stack. According to aspects, the network shaper 112 may use callouts to temporarily defer dispatching of inbound and outbound packets by storing them in internal packet queues and reinjecting back to the networking stack periodically. The network shaping rules described above may be executed by such callouts, which reinject network packets in amounts and frequency corresponding to the desired configuration of network bandwidth limitation (e.g., specified by the network shaping rules). In one implementation, the packet reinjection is performed via FwpsInject* family of functions provided by the WFP. Effectively, this will limit physical data transfer to the desired bandwidth. Additionally, it is noted that the local and remote server addresses and ports the remote session connection has been established to are known by the system. Since network packets contain source and destination addresses, ports, data type and other information, this information can be used to fine-tune traffic shaping rules on per-connection basis. Moreover, since WFP allows for the operation on a per-packet basis, network shaping bandwidth limits can be adjusted dynamically, as the described technique reinjects more or less packets in a given time frame.

At step 310, the remote session client 106 detects and automatically adapts the image quality of the remote session based on reduced network quality, causing a reduction in the amount of data exchanged between the remote server and the client over the communication channel. As described earlier, the remote protocol implementation may lower the picture quality and/or throttle the frame rate of the remote session GUI to match the detected reduced network bandwidth. In doing so, the remote session client 106 may render a less detailed image/framebuffer of the remote session GUI 208, at a lower frame rate, such that less resources and power is consumed by the client device 104.

At step 312, the activity monitor 114 checks whether the remote session client 106 has become active again (e.g., the remote application window has been brought to the front). If so, at step 314, the network shaper module 112 modifies the at least one network setting to restore the network quality of the communication channel so as to cause the client to restore image quality of the remote session. In some aspects, the activity monitor 114, responsive to detecting an active state of the remote session, directs to the network shaper module 112 to disable the network shaping rule(s), such that the network quality between the client device and remote server is restored. In turn, the remote session's image quality and performance is enhanced according to the remote protocol implementation (e.g., remote session client 106 and/or remote session agent 120).

Figure 4:
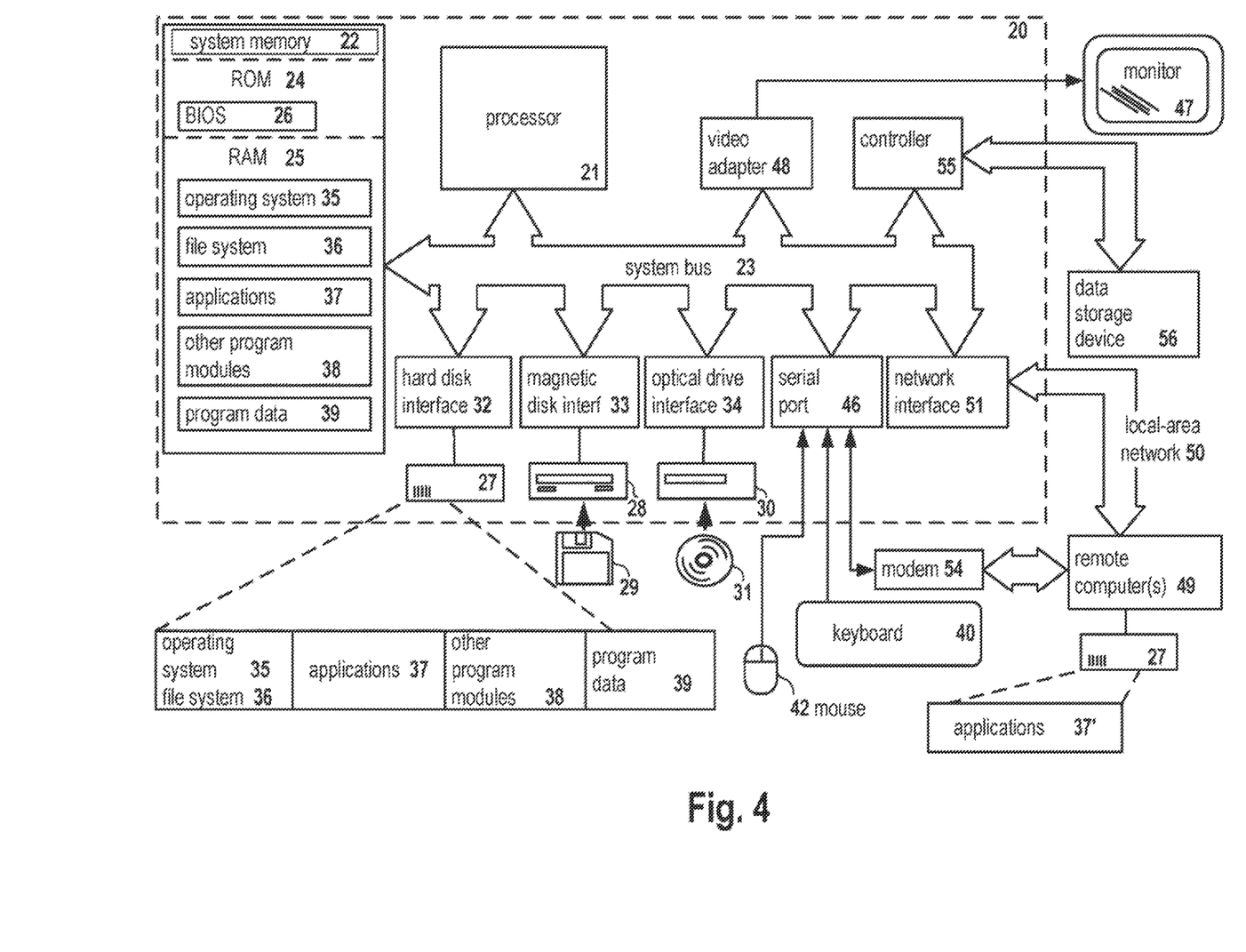
FIG. 4 is a block diagram of a computer system on which the disclosed system and method can be implemented according to an exemplary aspect.

FIG. 4 is a block diagram illustrating a computer system 20 on which aspects of systems and methods for managing computing resources in a remote session may be implemented in accordance with an exemplary aspect. It should be noted that the computer system 20 can correspond to the remote servers 102 and client device 104, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method, comprising:
   establishing, by a client computer system, a communication session with a server via a communication channel;
   detecting a state of a remote session associated the client computer system;
   determining whether the state of the remote session associated the client computer system upon the server is a predefined state; and
   upon a positive determination that the state of the remote session associated with the client computer system is the predefined state, modifying a network setting of the client computer system to reduce a bandwidth of the communication channel; wherein
   modifying the network setting of the client computer system to reduce a bandwidth of the communication channel comprises at least one of:
      a remote session agent executing upon the client computer system encoding each frame or frame buffer transmitted to the server as part of a remote session to a lower bitmap encoding rate; and
      the remote session agent executing upon the client computer system adapting a frame rate of frames transmitted to the server as part of the remote session to a lower frame rate;
   the remote session is hosted upon the server.

2. A client computer system, comprising:
   a network interface, and
   a hardware processor configured to:
   establish a communication session with a server via a communication channel using the network interface;
   detect an inactive state of the communication session; and
   responsive to detecting the inactive state, execute a packet filter configured to drop one or more network packets associated with the communication channel.

3. The client computer system of claim 2, wherein the hardware processor is further configured to:
   responsive to detecting an active state of the communication session, modify the network setting to restore the bandwidth of the communication channel.

4. The client computer system of claim 2, wherein the hardware processor is further configured to detect at least one of:
   a context switch of an application process corresponding to the communication session,
   a change in window visibility of the communication session,
   a threshold idle time period elapsed in the communication session,
   a display screen dimming of the client computer system, or
   a battery level of the client computer system reaching a threshold low level.

5. The client computer system of claim 2, wherein the hardware processor is further configured to:
   execute a traffic control system API (application programming interface) exposed by an operating system of the client computer system to decrease a quality-of-service setting of the communication channel.

6. A non-transitory computer-readable medium comprising executable instructions which, when executed by a client computer system, cause the client computer system to perform operations, comprising:
   establishing a communication session with a server via a communication channel;
   determining whether the state of a remote session associated the client computer system upon the server is a predefined state; and
   determining that a battery level of the client computer system is below a predetermined threshold;
   responsive to determining that the battery level is below a predetermined threshold setting the state of the current computer system to the predefined state;
   upon a positive determination that the state of the remote session associated with the client computer system is the predefined state, modifying a network setting of the client computer system to reduce a bandwidth of the communication channel; wherein
   modifying the network setting of the client computer system to reduce a bandwidth of the communication channel comprises at least one of:
      a remote session agent executing upon the client computer system encoding each frame or frame buffer transmitted to the server as part of a remote session to a lower bitmap encoding rate where the remote session hosted upon the server;
      the remote session agent executing upon the client computer system adapting a frame rate of frames transmitted to the server as part of the remote session to a lower frame rate where the remote session is hosted upon the server; and
      disabling a graphics processor unit (GPU) of the client computer system and upon a positive determination of the disabling of the GPU with a remote session agent executing upon the client computer system the remote session agent adapts a remote session between the client computer system and the server to decrease at least one of image quality and frame rate.

7. A method, comprising:
   establishing, by a client computer system, a communication session with a server via a communication channel;
   detecting a state of a remote session associated the client computer system;
   determining whether the state of the remote session associated the client computer system upon the server is a predefined state; and
   upon a positive determination that the state of the remote session associated with the client computer system is the predefined state, modifying a network setting of the client computer system to reduce a bandwidth of the communication channel; wherein
   modifying the network setting of the client computer system to reduce a bandwidth of the communication channel comprises:
      disabling a graphics processor unit (GPU) of the client computer system; and
      determining disabling of the GPU with a remote session agent executing upon the client computer system upon a positive determination of the disabling of the GPU the remote session agent adapts a remote session between the client computer system and the server to decrease at least one of image quality and frame rate.

8. A method, comprising:
   establishing, by a client computer system, a communication session with a server via a communication channel;

detecting a state of a remote session associated the client computer system;

determining whether the state of the remote session associated the client computer system upon the server is a predefined state; and upon a positive determination that the state of the remote session associated with the client computer system is the predefined state, modifying a network setting of the client computer system to reduce a bandwidth of the communication channel; wherein the predefined state is inactive;

the client computer system detects the state as being inactive based upon inactivity of the communication session exceeding a predetermined period of time; and responsive to detecting the state of the client computer system the client computer system modifies non-network related system settings of the client computer system.

9. A non-transitory computer-readable medium comprising executable instructions which, when executed by a client computer system, cause the client computer system to perform operations, comprising:

establishing a communication session with a server via a communication channel;

determining whether the state of a remote session associated the client computer system upon the server is a predefined state; and determining that a battery level of the client computer system is below a predetermined threshold;

responsive to determining that the battery level is below a predetermined threshold setting the state of the current computer system to the predefined state;

upon a positive determination that the state of the remote session associated with the client computer system is the predefined state, modifying a network setting of the client computer system to reduce a bandwidth of the communication channel; wherein the predefined state is inactive;

the client computer system detects the state as being inactive based upon inactivity of the communication session exceeding a predetermined period of time; and responsive to detecting the state of the client computer system the client computer system modifies non-network related system settings of the client computer system.

\* \* \* \* \*